United States Patent
Gritscher (10) Patent No.: US 11,008,059 B2
(45) Date of Patent: May 18, 2021

(54) MOUNTING SYSTEM FOR TOOL-FREE MOUNTING OF A CENTRE CONSOLE IN A MOTOR VEHICLE

(71) Applicant: Lisa Draexlmaier GmbH, Vilsbiburg (DE)

(72) Inventor: Karl Gritscher, Altdorf (DE)

(73) Assignee: Lisa Draeximaier GmbH, Vilsbiburg (DE)

(*) Notice: Subject to any disclaimer, the term of this patent is extended or adjusted under 35 U.S.C. 154(b) by 98 days.

(21) Appl. No.: 16/569,127

(22) Filed: Sep. 12, 2019

(65) Prior Publication Data

US 2020/0001939 A1    Jan. 2, 2020

Related U.S. Application Data

(63) Continuation of application No. PCT/DE2018/200026, filed on Mar. 12, 2018.

(30) Foreign Application Priority Data

Apr. 3, 2017 (DE) ...................... 10 2017 107 105.9

(51) Int. Cl.
*B62D 65/14* (2006.01)
*B60R 7/04* (2006.01)
(Continued)

(52) U.S. Cl.
CPC ................ *B62D 65/14* (2013.01); *B60R 7/04* (2013.01); *B60R 11/00* (2013.01); *B60R 13/0262* (2013.01); *B60R 2011/0007* (2013.01)

(58) Field of Classification Search
CPC ........... B62D 65/14; B60R 7/04; B60R 11/00; B60R 13/0262; B60R 2011/0007
(Continued)

(56) References Cited

U.S. PATENT DOCUMENTS 5,085,481 A  *  2/1992  Fluharty ................... B60R 7/04
                                                 296/37.14
5,106,143 A     4/1992  Soeters
(Continued)

FOREIGN PATENT DOCUMENTS

DE      10102136      9/2002
FR       2484034     12/1981

OTHER PUBLICATIONS

International Search Report for International Application PCT/DE2018/200026, dated May 18, 2018.

*Primary Examiner* — Pinel E Romain
(74) *Attorney, Agent, or Firm* — Burris Law, PLLC (57) ABSTRACT

An installation system for toolless installation of a central console in a motor vehicle is provided. The system includes a front fixing region on the central console and a front fixing region on a vehicle-side instrument panel, which engage one-into-the-other in an interference-fit manner in an intended installation position of the central console, a rear fixing region on the central console and a rear fixing region on a vehicle-side support, which with shifting of the central console in a predetermined installation direction directed toward the instrument panel, engage one-into-the-other even before reaching the intended installation position and fix the central console to the support transversely to the installation direction, wherein at least one central fixing region on the central console and at least one central fixing region on the vehicle-side support include respective toothings.

9 Claims, 6 Drawing Sheets

(51) Int. Cl.
*B60R 11/00* (2006.01)
*B60R 13/02* (2006.01)

(58) Field of Classification Search
USPC ................................. 296/37.8, 37.14, 24.34
See application file for complete search history.

(56) References Cited

U.S. PATENT DOCUMENTS

| | | | | |
|---|---|---|---|---|
| 5,609,382 | A | * | 3/1997 | Schmid ................... B60R 11/00 296/37.8 |
| 6,655,561 | B2 | * | 12/2003 | Panhelleux ............... B60R 7/04 224/275 |
| 7,156,438 | B2 | * | 1/2007 | Cowelchuk ............... B60R 7/04 296/24.34 |
| 7,222,906 | B2 | * | 5/2007 | Sakakibara ............... B60R 7/04 296/24.34 |
| 7,475,930 | B2 | * | 1/2009 | Windl ................... B62D 65/14 296/24.34 |
| 9,752,608 | B2 | | 9/2017 | Winklbauer |

* cited by examiner

MOUNTING SYSTEM FOR TOOL-FREE MOUNTING OF A CENTRE CONSOLE IN A MOTOR VEHICLE

CROSS-REFERENCE TO RELATED APPLICATIONS

This application is a continuation of International Application No. PCT/DE2018/200026, filed on Mar. 12, 2018, which claims priority to and the benefit of DE 10 2017 107 105.9, filed on Apr. 3, 2017. The disclosures of the above applications are incorporated herein by reference.

FIELD

The present disclosure relates to an installation system for toolless installation of a central console in a motor vehicle.

BACKGROUND

The statements in this section merely provide background information related to the present disclosure and may not constitute prior art.

Central consoles are typically attached in a front region to an instrument panel of a motor vehicle and in a rear region directly or via a holder on the bodyshell, e.g., to a central tunnel, of the motor vehicle. Here the central consoles are usually fixed by screws that are tightened by an assembler using a screwing tool. For one thing it negatively impacts assembly time when central consoles must be screwed in a motor vehicle. In addition, there is also the risk during assembly that, for example, parts of the central console are damaged during the screwing either by the screws or also by the screwing tools used.

DE 10 2010 041 048 A1 discloses an installation system for toolless installation of a central console in a motor vehicle. A front fixing region on the central console and a front region on a vehicle-side instrument panel can enter into a snap connection in the intended installation position of the central console, so that the central console is fixed in its intended installation position on the instrument panel. Furthermore, a rear fixing region on the central console can interact in a bar-type manner with a rear fixing region on a vehicle-side support, so that with shifting of the central console in a predetermined installation direction directed toward the instrument panel, even before reaching the intended installation position the rear fixing region on the central console and the rear fixing region on the vehicle-side support engage one-into-the-other and fix the central console transversely on the support with respect to the installation direction.

A series of tolerances play a role in the exact installation of a central console in a motor vehicle. Due to manufacturing tolerances, certain dimensional fluctuations arise in the central console, the instrument panel, and also in the bodyshell of the motor vehicle. The exact disposing and attaching of the central console at certain connection points of the instrument panel and bodyshell can thereby be made more difficult, which in turn makes more difficult the exact installation of the central console in the motor vehicle. Furthermore, forces acting on the fully assembled central console, e.g., because a vehicle occupant is supported on the central console, must be able to be reliably supported. This can in turn best be realized best by a particularly play-free, i.e., exact installation of the central console.

SUMMARY

The present disclosure provides an installation system for toolless installation of a central console in a motor vehicle, using which installation system central-console-side and vehicle-side dimensional fluctuations can be compensated particularly easily for exact installation of the central console.

The installation system according to the present disclosure for toolless installation of a central console in a motor vehicle comprises a front fixing region on the central console and a front fixing region on a vehicle-side instrument panel that interact with each other in an interference-fit manner in an intended installation position of the central console. Furthermore, the installation system comprises a rear fixing region on the central console and a rear fixing region on a vehicle-side support, which engage one-into-the-other with the shifting of the central console in a predetermined installation direction directed toward the instrument panel even before reaching the intended installation position and fix the central console to the support transversely with respect to the installation direction. The vehicle-side support can be, for example, a central tunnel of the motor vehicle. In principle, the vehicle-side support can be any component of the motor vehicle, on which component the central console is installed. The installation system according to the present disclosure comprises at least one central fixing region on the central console and by at least one central fixing region on the vehicle-side support, which have respective toothings that engage one-into-the-other with a different overlap with shifting of the central console in the predetermined installation direction prior to reaching the intended installation position in a manner depending on a relative height position of the central console with respect to the motor vehicle, and fix the central console on the support transversely to the installation direction.

A feature of the installation system according to the present disclosure relates to the respective toothings on the central-console-side central fixing region and on the central fixing region on the vehicle-side support. The toothings on the two central fixing regions are adapted to each other and shaped such that when shifting the central console in the predetermined installation direction they engage one-into-the-other before reaching the intended installation position of the central console. The toothings thus act as counter-toothings that are independently found to be at the correct height, and specifically in particular depending on how the central console is positioned relative to the rest of the motor vehicle.

The toothings extend over a large enough region that even with the unfavorable summation of central-console-side and vehicle-side tolerances or dimensional fluctuations, a predetermined minimum overlap is still provided with the mutually engaging toothings. Installation tolerances and also component tolerances on the central console, on the instrument panel, and also on the vehicle-side support can thereby be compensated. In the installed state of the central console, i.e., after installation of the central console, the toothings also allow forces acting on the central console due to the interference fit thereby produced to be reliably supported.

A tolerance compensation in the vehicle-side direction is thus provided by the central fixing region on the central console and the central fixing region on the vehicle-side support that have the respective toothings. Depending on how the respective central console is positioned during installation in the respective motor vehicle and which manufacturing tolerances the respective central consoles, instrument panels, and vehicle-side supports have, a tolerance compensation in the vehicle height direction can also be achieved in a particularly simple manner during installation of the respective central console in the respective motor vehicle.

An advantageous form of the present disclosure includes the central fixing region disposed on the central console in the region of an opening for a gear selector lever. In particular in the region of the gear selector lever it can happen that a driver or also a passenger is supported around the region of the opening provided for the gear selector lever. Since the central fixing region is disposed on the central console in the region of an opening for a gear selector lever, forces occurring in this region, in particular in the direction transverse to the vehicle and in the vehicle height direction, can be absorbed. It can thereby be provided that the central console remains securely fixed to the rest of the vehicle in the region around the opening for the gear selector lever even with large occurring loads.

A further advantageous form of the present disclosure includes the toothings of the central fixing regions only mutually engaging when at least one of the central fixing regions is expanded or narrowed. For this purpose, for example, the installation system can have a type of conical bolts or also other aids, using which at least one of the central fixing regions can be expanded or narrowed, only due to which the toothings of the central fixing regions engage one-into-the-other. Thus with shifting of the central console up to reaching its intended installation position the resistance can initially be kept low, wherein only after the central console is disposed in its intended installation position and has been fixed to the instrument panel, at least one of the central fixing regions is expanded or narrowed, so that the toothings of the central fixing regions engage one-into-the-other. Alternatively, however, it is also possible that the central fixing regions are adapted to each other and shaped such that the toothings directly engage one-into-the-other as soon as the central console has been shifted so far towards the instrument panel in the vehicle longitudinal direction that the respective toothings of the central fixing region can enter into engagement with each other. In this case the means mentioned can be omitted in order to expand or narrow at least one of the central fixing regions, since the respective toothings of the central fixing regions engage one-into-the-other equally as soon as they have been disposed in a mutually corresponding manner.

In a further advantageous design of the present disclosure, the front fixing region on the central console and/or the front fixing region on the instrument panel includes spring elements that resiliently fix the central console to the instrument panel supported in its intended installation position. The spring elements can make possible a resilient supporting of the central console on the instrument panel in the vehicle longitudinal direction, in the vehicle height direction, and/or in the vehicle transverse direction. The front fixing region on the central console can thus be resiliently supported on the front fixing region of the instrument panel by the spring elements. Different tolerances can thereby be compensated. Furthermore, rattling can be inhibited since the front fixing region on the central console is fixedly clamped on the front fixing region of the instrument panel by the spring elements. The spring elements can be, for example, plastic components that are an integral component of the front fixing region on the central console and/or the front fixing region on the instrument panel. Furthermore, it is possible that part of the spring elements or all spring elements are manufactured from a metallic material. In addition, the spring elements can be manufactured from a two-component plastic, wherein one of the two components is comprised of a rubber-type, i.e., elastic, material. The rubber-type component can counteract creaking noises.

According to a further advantageous form of the present disclosure, the rear fixing region on the central console and/or the rear fixing region on the vehicle-side support includes spring elements that fix the central console on the vehicle-side support in its intended installation position in a resiliently supported manner. Due to the spring elements, the rear fixing region of the central console can be resiliently supported on the rear fixing region of the vehicle-side support. In particular, the rear fixing region of the central console is resiliently supported by the spring elements in the vehicle transverse direction and in the vehicle longitudinal direction with respect to the rear fixing region of the vehicle-side support. Tolerances or dimensional fluctuations can thereby be compensated in a simple manner. In addition, rattling can be inhibited by the resilient supporting, since the central-console-side and carrier-side rear fixing regions are attached to each other without play. The spring elements can in turn be plastic parts, parts made of a two-component plastic, wherein one of the two components is rubber-type, and/or metal parts.

A further advantageous form of the present disclosure includes the instrument panel, in particular the front fixing region on the instrument panel, having an abutment surface for resting the front fixing region provided on the central console. This greatly facilitates the installation of the central console, since the central console can first be placed on the abutment surface before it is shifted or moved toward the instrument panel, in order to bring the central console into its intended installation position.

According to a further advantageous form of the present disclosure, it is provided that the vehicle-side support, in particular the rear fixing region on the vehicle-side support, has an abutment surface for resting the rear fixing region provided on the central console. This facilitates the installation of the central console, since it can be placed with its rear fixing region on the abutment surface of the vehicle-side support, particularly on the abutment surface provided on the rear fixing region of the vehicle-side support. The central console can subsequently be pushed particularly easily toward the instrument panel until the central console has been disposed in its intended installation position.

In a further advantageous design of the present disclosure, the front fixing region on the instrument panel includes at least one snap hook that in the intended installation position engages around the front fixing region on the central console. Using the at least one snap hook, an interference fit between the central console and the instrument panel can be produced in a particularly simple manner in order to reliably fix the two components to each other. If the central console must be removed, then the snap hook can be released again. The central console can subsequently be pushed away from the instrument panel in order to then in turn remove it. Due to the providing of the at least one snap hook, the central console can be fixed to the instrument panel with a relatively small exertion of force and released from it again when desired. Optionally the snap hook or at least one region of the snap hook, which region serves as abutment surface for the front fixing region, is manufactured from a two-component plastic, wherein one of the two components is manufactured from a rubber-type elastic material. The front fixing region can rest on this rubber-type elastic material. Thus, creaking noises can be inhibited since the rubber-type elastic material clings to the front fixing region.

Further, according to another advantageous form of the present disclosure, the central and rear fixing regions are disposed such that with shifting of the central console towards the instrument panel, first the rear fixing regions and only then the toothings of the central fixing regions engage one-into-the-other. The tolerance compensation in the vehicle height direction is thereby effected by the different degree of overlapping of the mutually engaging toothings only when the central console is already fixed to the rear fixing region on the rear fixing region of the vehicle-side support in the vehicle height direction, and also in the transverse direction of the vehicle. The central console can, for example, first be placed in its front region and its rear region, wherein with shifting of the central console towards the instrument panel, the rear fixing regions then first engage one-into-the-other in an interference-fit manner. By further shifting of the central console toward the instrument panel, the mentioned toothings of the central fixing regions then enter into engagement with each other, whereby the central console is fixed vehicle-side in its central region in the vehicle height direction and the vehicle transverse direction. Dimensional fluctuations in the central console, the instrument panel, and the vehicle-side support, and fluctuations resulting therefrom with respect to the relative positioning of the central console in the vehicle height direction with respect to the instrument panel and the vehicle-side support can be particularly easily compensated by the toothings.

Further advantages, features, and details of the present disclosure arise from the following description of exemplary forms as well as with reference to the drawings. The features and features combinations mentioned above in the description, as well as the features and feature combinations shown below in the Figure description and/or in the Figures alone are usable not only in the combination specified, but also alone without departing from the context of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the Figures identical or functionally identical elements have been provided with the same reference numbers.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
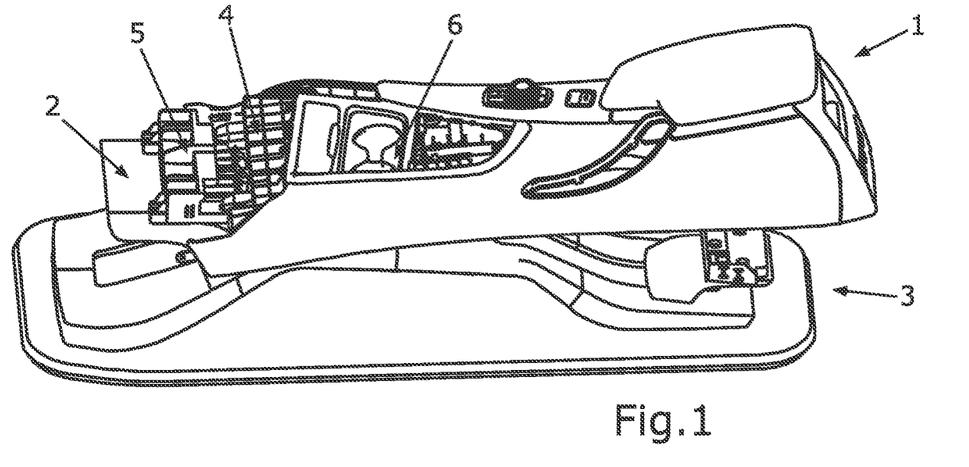
FIG. 1 is a perspective side view of an exemplary central console that is installed on an instrument panel only indicated schematically and on a central tunnel of a motor vehicle, which central tunnel is also only schematically indicated according to the present disclosure.

A central console 1, which is installed on an instrument panel 2 and on a central tunnel 3, is shown in a lateral perspective view in FIG. 1. A front fixing region 4 on the central console 1 is attached at a corresponding front fixing region 5 to the instrument panel 2. Furthermore, an opening 6 for a gear selector lever not depicted here can also be seen. The central console 1 can be installed completely without tools on the instrument panel 2 and on the central tunnel 3.

Figure 2:
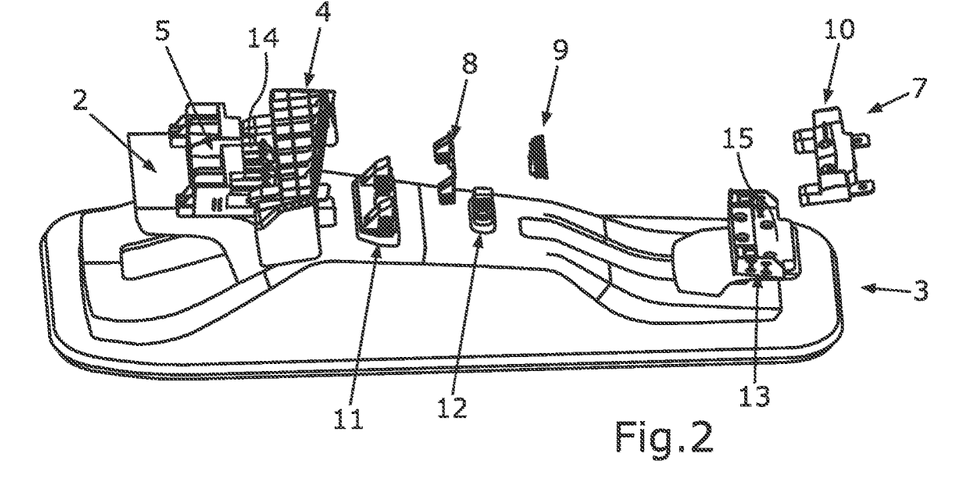
FIG. 2 is a perspective side view of an exemplary installation system for toolless installation of the central console on the instrument panel and the central tunnel, wherein the installation system includes respective central-console-side, instrument-panel-side, and central-tunnel-side front, central, and rear fixing regions according to the present disclosure.

In FIG. 2, an installation system 7 for toolless installation of the central console 1 on the instrument panel 2 and on the central tunnel 3 is depicted. In addition to the front fixing region 4 on the central console 1 and the front fixing region 5 on the central console 1, the installation system 7 also comprises two central fixing regions 8, 9 on the central console 1, a rear fixing region 10 on the central console 1, two central fixing regions 11, 12 on the central tunnel 3, as well as a rear fixing region 13 on the central tunnel 3. The central fixing region 8 on the central console 1 can engage into the central fixing region 11 on the central tunnel 3 in an interference-fit manner. The same applies for the central fixing region 9 on the central console 1 and the central fixing region 12 on the central tunnel 3. The rear fixing region 10 on the central console 1 can furthermore engage into the rear fixing region 13 on the central tunnel 3 in an interference-fit manner. The exact interaction of the respective fixing regions 4, 5, 8, 9, 10, 11, 12, 13 is explained more precisely with reference to the following Figures.

In the present illustration according to FIG. 2, the central console 1 was first only placed with its front fixing region 4 onto an abutment surface 14 of the front fixing region 5 of the instrument panel 2.

Figure 3:
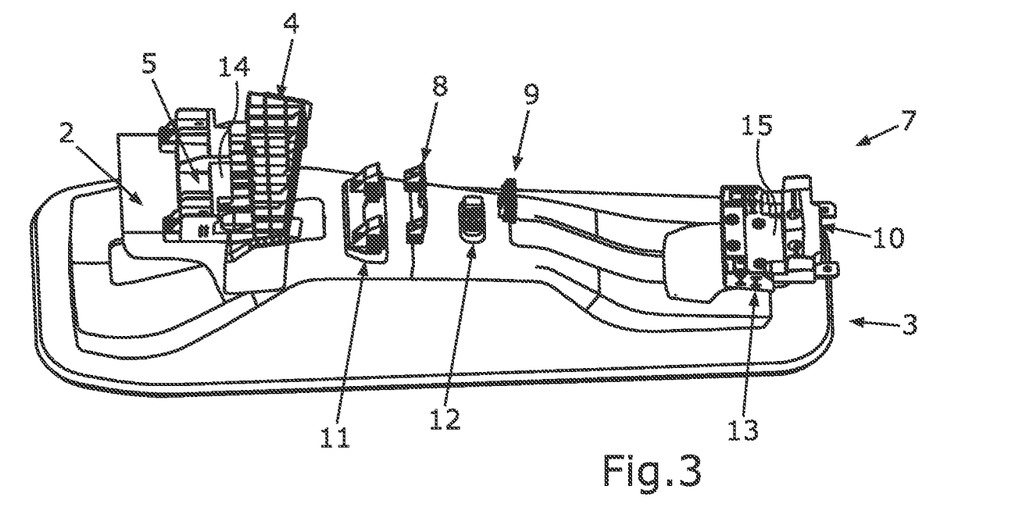
FIG. 3 is a further perspective side view of the installation system, wherein the central console has been placed with the rear fixing region on the rear central-tunnel-side fixing region according to the present disclosure.

In FIG. 3 the installation system 7 is shown in a further perspective view, wherein the remaining central console 1, also not depicted in more detail here, has been lowered with its rear fixing region 10 on an abutment surface 15 of the rear fixing region 13 on the central tunnel 3. As can be seen, the central-console-side central fixing regions 8, 9 are still disposed spaced away from the central-tunnel-side fixing region 11, 12. After the central console 1 has been placed with its front fixing region 4 and with its rear fixing region 10 on the respective abutment surfaces 14, 15, it can be shifted toward the instrument panel 2, i.e., in the vehicle longitudinal direction.

Figure 4:
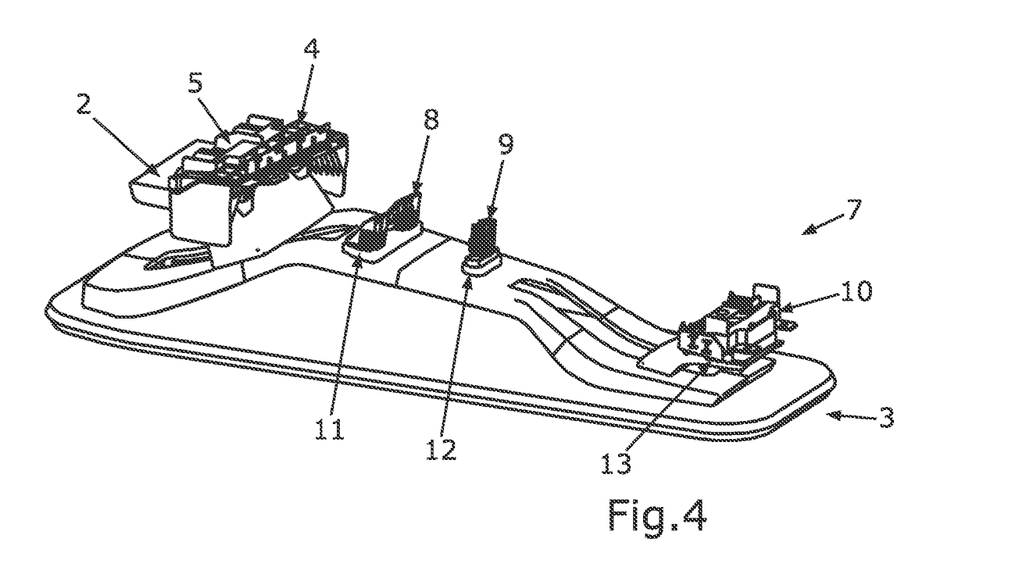
FIG. 4 is a further perspective side view of the installation system, wherein the central console has been shifted so far toward the instrument panel that the central-console-side fixing regions abut in an interference-fit manner on the instrument-panel-side and central-tunnel-side fixing regions according to the present disclosure.

In FIG. 4 the installation system 7 is shown in a further perspective view. In the present illustration, the central console 1 is disposed in its intended installation position. In this intended installation position, the front fixing region 4 of the central console 1 is retained on the instrument panel 2 in an interference-fit manner using the front fixing region 5 of the instrument panel 2. Using the front fixing region 5, the front fixing region 4 is fixed in the vehicle longitudinal direction, in the vehicle transverse direction, and in the vehicle height direction. At the other fixing regions 8, 9, 10, 11, 12, 13 a fixing of the central console 1 is effected with respect to the vehicle longitudinal direction as a floating bearing. That means that the central console 1 is fixed by the fixing regions 8, 9, 10, 11, 12, 13 only in the vehicle transverse direction and in the vehicle height direction.

Figure 5:
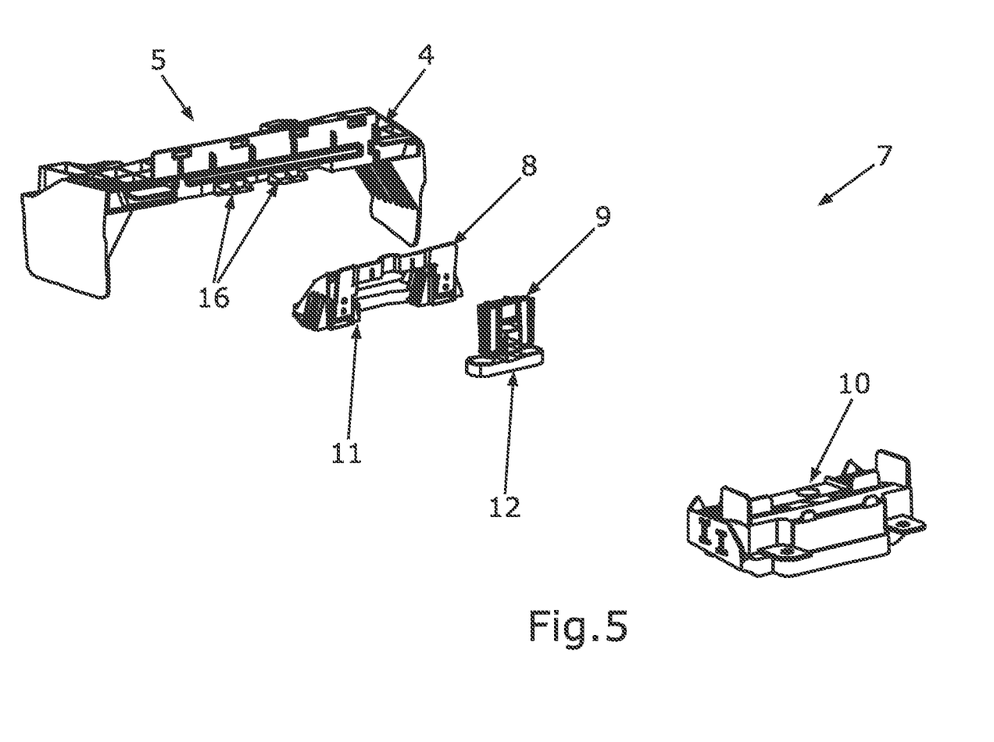
FIG. 5 is a perspective view of the installation system, wherein only the front, central, and rear fixing regions of the central console, the instrument panel, and the central tunnel are depicted according to the present disclosure.

In FIG. 5 the installation system 7 is shown in a further perspective view, wherein only the central-console-side and the instrument-panel-side or central-tunnel-side fixing regions 4 to 13 are depicted. The front fixing region 5, which is provided on the instrument panel 2, not depicted in more detail, includes two snap hooks 16, which, in the intended installation position of the central console 1, engage around the front fixing region 4 on the central console 1. Due to the U-shaped profile of the front fixing region 4, it is also fixed in the vehicle transverse direction to the front fixing region 5. As soon as the snap hooks 16 are latched and thereby engage around the front fixing region 4, the central console 1 is also fixed in the vehicle height direction to the instrument panel 2 not depicted in more detail here.

With shifting of the central console 1 in the vehicle longitudinal direction, the rear fixing region 10 on the central console 1 and the rear fixing region 13 on the central tunnel 3 engage one-into-the-other even before reaching the intended installation position in the central console 1. Thus, the central console 1 is fixed to the central tunnel 3 transversely to the vehicle longitudinal direction, i.e., in the vehicle height direction and in the vehicle transverse direction.

The central-console-side central fixing regions 8, 9 as well as the central-tunnel-side central fixing regions 11, 12 also engage one-into-the-other with shifting of the central console 1 even before reaching the intended installation position of the central console 1, whereby the central console 1 is fixed to the central tunnel 3 in the vehicle height direction and in the vehicle transverse direction.

Figure 6:
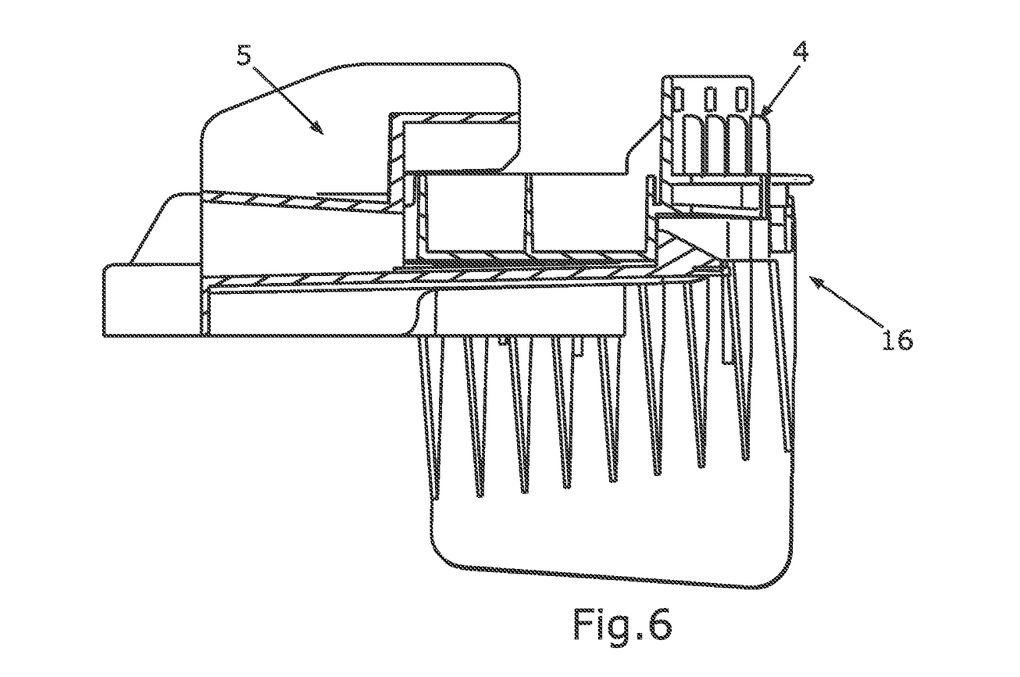
FIG. 6 is a side cross-sectional view, wherein the interference-fit engagement of the front fixing regions of the central console and instrument panel is depicted according to the present disclosure.

In FIG. 6, the front fixing region 4 on the central console 1 and the front fixing region 5 on the instrument panel 2 are shown in an enlarged detail view. Here again one of the snap hooks 16 is also readily visible that is provided on the front fixing region 5 of the instrument panel 2. Since in the intended installation position of the central console 1 the two snap hooks 16 engage around the front fixing region 4 on the central console 1, the front fixing region 4 is fixed on the front fixing region 5 in the vehicle height direction and in the vehicle longitudinal direction. As already mentioned, the fixing of the central console 1 is effected in the region of the instrument panel 2 in the vehicle transverse direction by the front fixing region 4 having an essentially U-shaped cross-section, so that the front fixing region 4 abuts on the front fixing region 5 on the outer side in an interference-fit manner in the vehicle transverse direction.

Figure 7:
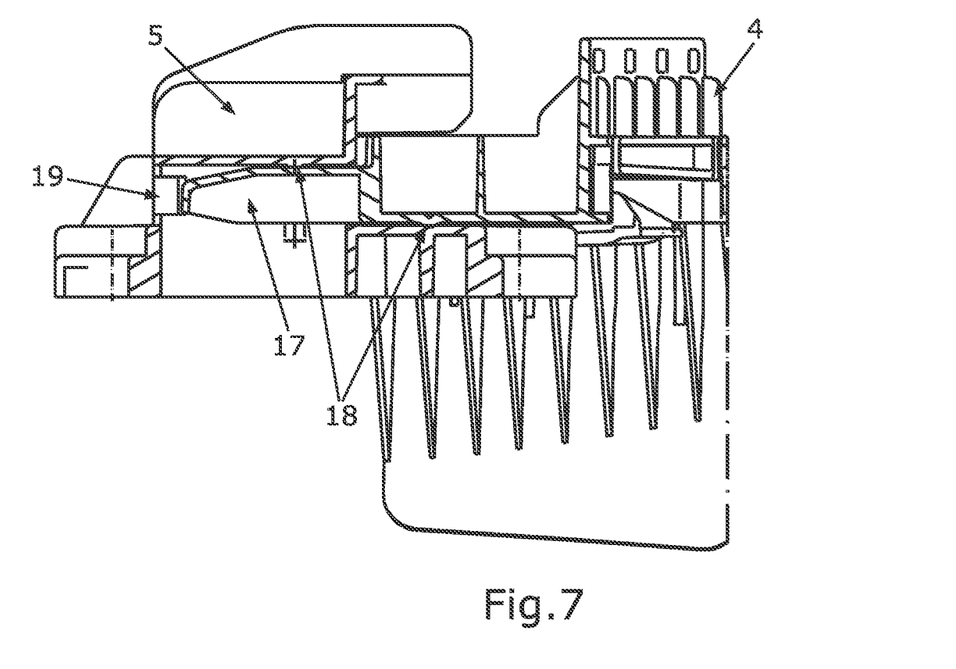
FIG. 7 is a further side cross-sectional view, wherein the interference-fit engagement of the front fixing regions of central console and instrument panel is depicted from another perspective according to the present disclosure.

In FIG. 7, the front fixing region 4 on the central console 1 and the front fixing region 5 on the instrument panel 2 are shown in a further perspective view. In the present illustration, a protrusion 17 of the front fixing region 4 is visible that enters into a not-further-indicated opening of the front fixing region 5. This lug-type protrusion 17 facilitates the introduction of the front central-tunnel-side fixing region 4 into the front fixing region 5 of the instrument panel 2. Both on the front central-console-side fixing region 4 and on the front instrument-panel-side fixing region 5, a plurality of spring elements 18, 19, are provided, whereby the central-console-side front fixing region 4 is resiliently supported on the instrument-panel-side front fixing region 5. On the one hand a certain tolerance compensation during installation of the central console 1 can be achieved due to the spring elements 18, 19. Furthermore, it is provided by the spring elements 18, 19 that the central-console-side front fixing region 4 is retained in a play-free manner on the instrument-side front fixing region 5. Therefore, rattling of the front fixing regions 4, 5 is inhibited.

Figure 8:
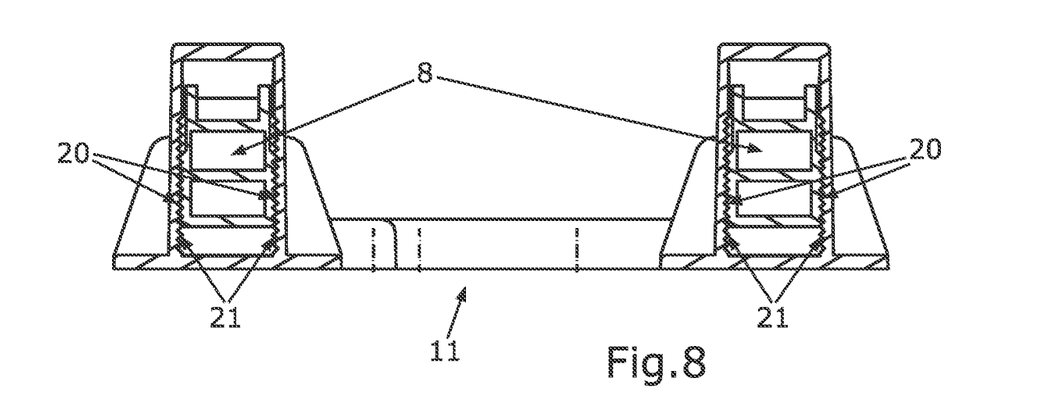
FIG. 8 is a side cross-sectional view, wherein the interference-fit engagement of a part of the central fixing regions of the central console and central tunnel is depicted according to the present disclosure.

In FIG. 8, the central-console-side fixing regions 8 disposed closer to the instrument panel 2, and central-tunnel-side central fixing regions 11 are shown in a detail view. The central fixing regions 8, 11 have respective toothings 20, 21 that engage one-into-the-other. With shifting of the central console 1 in the vehicle longitudinal direction, the toothings 20, 21 also engage one-into-the-other, with different overlap depending on a relative height position of the central console 1 with respect to the rest of the motor vehicle, even before reaching the intended installation position of the central console 1. At the central fixing regions 8, 11, the toothings 20, 21 are formed as respective teeth that are disposed one-behind-the-other in the vehicle height direction. Due to component tolerances it can happen that the central fixing regions 8, 11 can be aligned differently to each other in the vehicle height direction. Due to the providing of the toothings 20, 21, a tolerance compensation in the vehicle height direction is made possible. Depending on the way the central fixing regions 8, 11 are oriented relative to each other in the vehicle height direction, the toothings 20, 21 engage one-into-the-other with a differently sized overlap. A particularly tension-free installation of the central console 1 can be effected by a particularly fine distribution of the toothings 20, 21.

Figure 9:
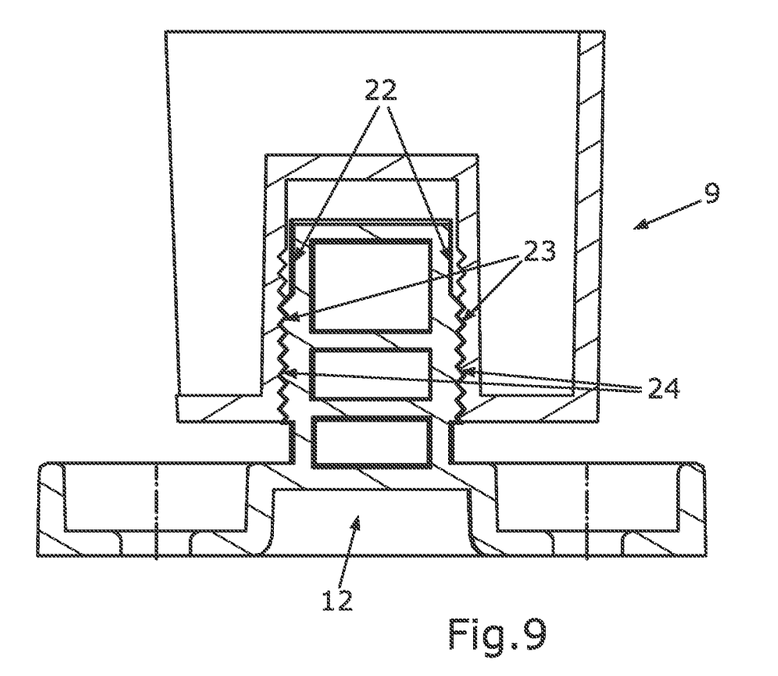
FIG. 9 is a side cross-sectional view, wherein the interference-fit engagement of a further part of the central fixing regions of the central console and central tunnel is depicted according to the present disclosure.

In FIG. 9, the central fixing regions 9, 12, further remote from the instrument panel 2, of the central console 1 and of the central tunnel 3 are shown in a perspective detail view. The central-console-side central fixing region 9 and the central-tunnel-side central fixing region 12 also have respective toothings 23, 24. The toothings 23 on the U-shaped central fixing region 9 are formed on respective inner sides 22 so that they surround the toothings 24 on the outer circumferential side. Due to the toothings 23, 24, with mutual engagement a tolerance compensation in the vehicle height direction during installation of the central console 1 is also achieved. Depending on the way the central console 1 is positioned relative to the rest of the motor vehicle, the toothings 23, 24 engage one-into-the-other with a differently sized overlap.

Due to the central-console-side central fixing regions 8, 9 and the central-tunnel-side central fixing regions 11, 12 with their respective toothings 20, 21, 23, 24, it is also provided, in addition to the tolerance compensation in the vehicle height direction, that forces exerted, in the vehicle height direction and in the vehicle transverse direction, on the central console 1 around the opening 6 provided for the gear selector lever can be reliably supported. If, for example, a vehicle occupant supports himself from above on the central console in the region of the opening 6, then the toothings 20, 21, 23, 24 exert corresponding forces in the vehicle height direction, so that the central console 1 does not sag in the region around the opening 6. The same applies to the cases wherein vehicle occupants exert forces on the central console 1 in the vehicle transverse direction in the region of the opening 6.

Figure 10:
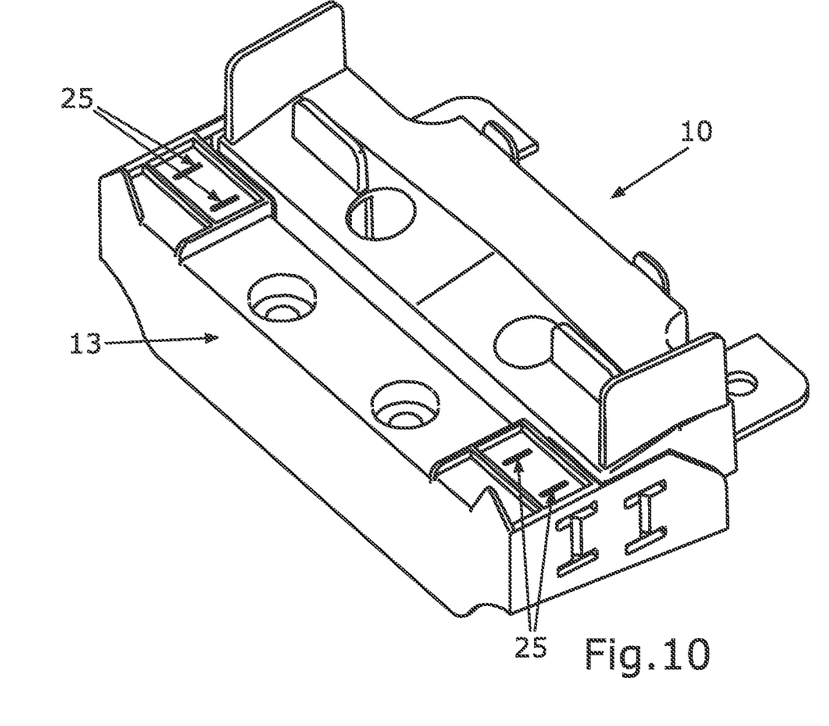
FIG. 10 is a perspective detail view, wherein the interference-fit engagement of the rear fixing region on the central console and a rear fixing region on the central tunnel is depicted according to the present disclosure.

In FIG. 10, the central-console-side rear fixing region and the central-tunnel-side rear fixing region 13 are shown in a detail view. The central-console-side rear fixing region 10 enters in an interference-fit manner into the central-tunnel-side rear fixing region 13, so that the central console 1 is fixed to the central tunnel 3 in the vehicle transverse direction and in the vehicle height direction. Furthermore, a plurality of spring elements 25 are provided on the central-tunnel-side fixing region 13, which spring elements 25 make possible a resilient fixing of the central-console-side rear fixing region 10 in the vehicle transverse direction and in the vehicle height direction. Thus, on the one hand certain component tolerances can be compensated and on the other hand a rattling due to the resilient interference-fit connection is avoided.

Figure 11:
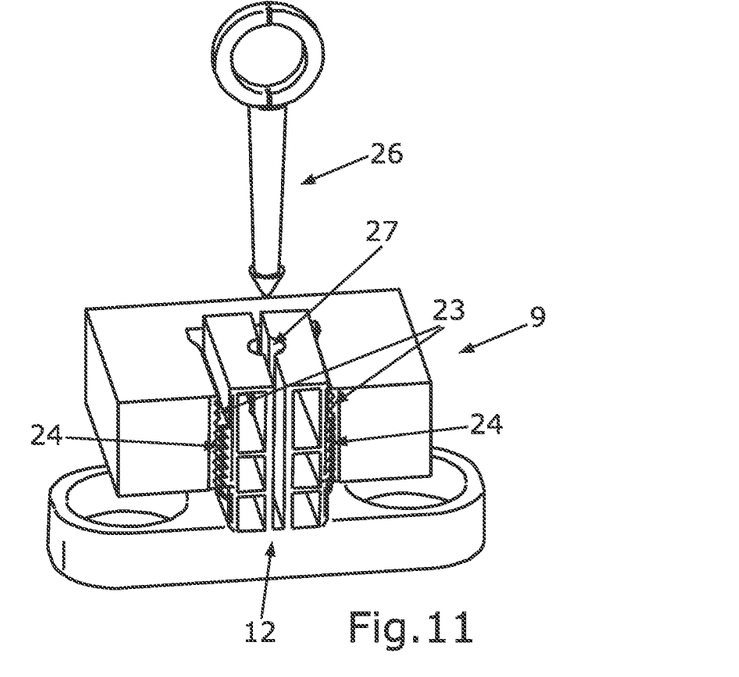
FIG. 11 is a perspective view of another form of a part of the central fixing regions of the central console and central tunnel according to the present disclosure.

In FIG. 11 another form of the central-console-side central fixing region 9 and of the central-tunnel-side central fixing region 12 is shown in a perspective view. The toothings 23, 24 of the respective central fixing regions 9, 12 only engage one-into-the-other when a mandrel 26 has been introduced into an opening 27 of the central fixing region 12. Due to the introducing of the mandrel 26, the central fixing region 9 is expanded; consequently, only the toothings 23, 24 engage one-into-the-other. The final interference fit between the toothings 23, 24 is thus only achieved by the spreading of the central-tunnel-side central fixing region 12. Provided the mandrel 26 has not yet been introduced into the opening 27, the central console 1 can thus slide relatively resistance-free along the central-tunnel-side central fixing region 12 by its central-tunnel-side central fixing region 9.

Figure 12:
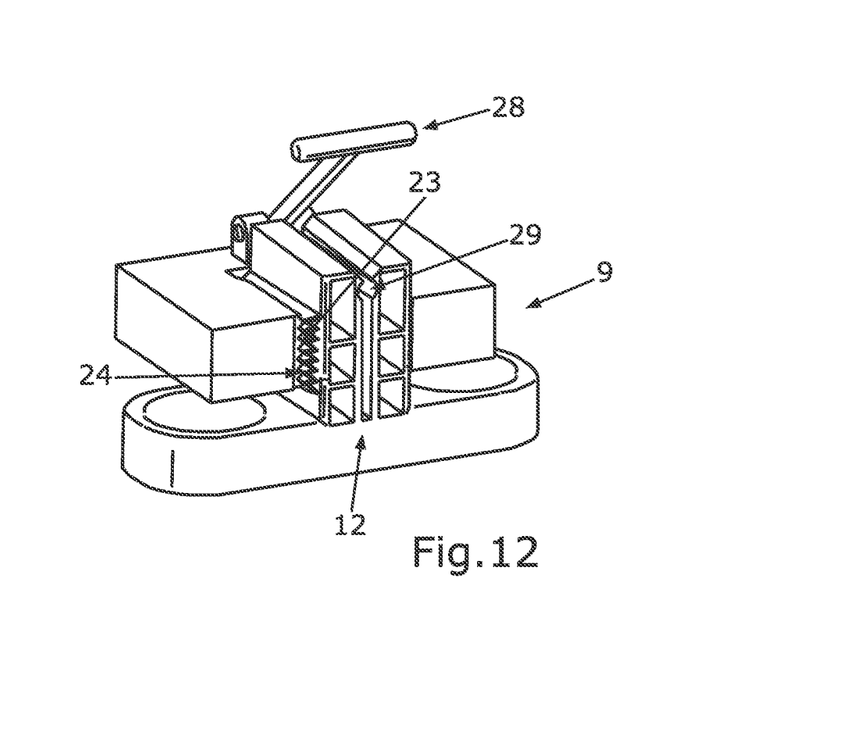
FIG. 12 is a perspective view of an alternative form of a part of the central fixing regions of the central console and central tunnel according to the present disclosure.

In FIG. 12 an alternative form of the central-console-side central fixing region 9 and of the central-tunnel-side central fixing region 12 is shown. The functional principle is the same as in the exemplary form in FIG. 11, wherein instead of the mandrel 26 a lever 28 is moved downwards and introduced into an opening 29. As soon as the lever 28 has been folded downward so that it is disposed in the opening 29, the central-tunnel-side central fixing region 12 is in turn expanded; consequently, only the toothings 23, 24 completely engage one-into-the-other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An installation system for toolless installation of a central console in a motor vehicle, the installation system comprising:
   a front fixing region on the central console and a front fixing region on a vehicle-side instrument panel, which engage one-into-the-other in an interference-fit manner in an installation position of the central console; and
   a rear fixing region on the central console and a rear fixing region on a vehicle-side support, which engage one-into-the-other before reaching an installation position and fix the central console to the vehicle-side support transversely to an installation direction,
   wherein at least one central fixing region on the central console and at least one central fixing region on the vehicle-side support, the central fixing regions having respective toothings, which, with shifting of the central console in the installation direction, engage one-into-the-other with a different overlap depending on a relative height position of the central console with respect to the motor vehicle before reaching the installation position and fix the central console to the vehicle-side support transversely to the installation direction.

2. The installation system according to claim 1, wherein the central fixing region on the central console is disposed in a region of an opening for a gear selector lever.

3. The installation system according to claim 1, wherein the toothings of the central fixing regions only engage one-into-the-other when at least one of the central fixing regions is expanded or narrowed.

4. The installation system according to claim 1, wherein the front fixing region on at least one of the central console and the front fixing region on the instrument panel includes spring elements that fix the central console to the instrument panel in the installation position in a resiliently supported manner.

5. The installation system according to claim 1, wherein the rear fixing region on at least one of the central console and the rear fixing region on the vehicle-side support includes spring elements, which fix the central console to the vehicle-side support in the installation position in a resiliently supported manner.

6. The installation system according to claim 1, wherein the front fixing region on the instrument panel includes an abutment surface for placing the front fixing region of the central console.

7. The installation system according to claim 1, wherein the rear fixing region on the vehicle-side support includes an abutment surface for placing the rear fixing region of the central console.

8. The installation system according to claim 1, wherein the front fixing region on the instrument panel includes at least one snap hook that, in the installation position, engages around the front fixing region of central console.

9. The installation system according to claim 1, wherein the central and rear fixing regions are disposed such that with shifting of the central console toward the instrument panel, first the rear fixing regions and only then the toothings of the central fixing regions engage one-into-the-other.

\* \* \* \* \*

UNITED STATES PATENT AND TRADEMARK OFFICE
CERTIFICATE OF CORRECTION

| | | |
|---|---|---|
| PATENT NO. | : 11,008,059 B2 | Page 1 of 1 |
| APPLICATION NO. | : 16/569127 | |
| DATED | : May 18, 2021 | |
| INVENTOR(S) | : Karl Gritscher | |

It is certified that error appears in the above-identified patent and that said Letters Patent is hereby corrected as shown below:

On the Title Page

Item [73], delete "Lisa Draeximaier GmbH" and insert --Lisa Draexlmaier GmbH--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*